United States Patent
Qin et al.

(10) Patent No.: US 12,461,969 B2
(45) Date of Patent: Nov. 4, 2025

(54) GRAPH DATA PARTITIONING

(71) Applicant: ALIPAY (HANGZHOU) INFORMATION TECHNOLOGY CO., LTD., Zhejiang (CN)

(72) Inventors: Wei Qin, Hangzhou (CN); Jiping Yu, Hangzhou (CN); Xiaowei Zhu, Hangzhou (CN); Wenguang Chen, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 16 days.

(21) Appl. No.: 18/394,497

(22) Filed: Dec. 22, 2023

(65) Prior Publication Data

US 2024/0143657 A1    May 2, 2024

Related U.S. Application Data

(63) Continuation of application No. PCT/CN2022/131042, filed on Nov. 10, 2022.

(30) Foreign Application Priority Data

Nov. 15, 2021  (CN) .......................... 202111345319.4

(51) Int. Cl.
*G06F 16/901* (2019.01)
*G06F 11/34* (2006.01)

(52) U.S. Cl.
CPC ...... *G06F 16/9024* (2019.01); *G06F 11/3433* (2013.01)

(58) Field of Classification Search
CPC .. G06F 16/9024; G06F 11/3433; G06F 16/51; G06F 16/583
See application file for complete search history.

(56) References Cited

U.S. PATENT DOCUMENTS

| | | | |
|---|---|---|---|
| 9,477,532 B1 * | 10/2016 | Hong | .................... G06F 9/4881 |
| 2014/0320497 A1 | 10/2014 | Vojnovic et al. | |

(Continued)

FOREIGN PATENT DOCUMENTS

| | | |
|---|---|---|
| CN | 103699606 | 4/2014 |
| CN | 104915187 | 9/2015 |

(Continued)

OTHER PUBLICATIONS

Abbas et al., "Streaming graph partitioning: an experimental study," Proceedings of the VLDB Endowment, Jul. 31, 2018, 11(11):1590-603.

(Continued)

*Primary Examiner* — Maher N Algibhah
(74) *Attorney, Agent, or Firm* — Fish & Richardson P.C.

(57) ABSTRACT

Embodiments of this specification disclose graph data partition computer-implemented methods, non-transitory, computer-readable media, and computer-implemented systems. A computer-implemented method includes partitioning vertices in graph data into a plurality of dataset. Edges in the graph data are partitioned into datasets that include target vertices of the edges, where the datasets are used by nodes in a distributed cluster to perform graph computation, and where computational loads of the plurality of datasets are similar. Implementations of this specification can achieve load balancing between nodes in the distributed cluster and can reduce communication overhead.

20 Claims, 4 Drawing Sheets

(56) References Cited

U.S. PATENT DOCUMENTS

| | | | |
|---|---|---|---|
| 2014/0354649 | A1 | 12/2014 | Aksu et al. |
| 2019/0012759 | A1 | 1/2019 | Lee et al. |
| 2019/0278808 | A1* | 9/2019 | Xia .................... G06F 16/9024 |
| 2020/0137661 | A1 | 4/2020 | Rahman et al. |
| 2022/0156324 | A1* | 5/2022 | Zhang .................... G06F 17/10 |

FOREIGN PATENT DOCUMENTS

| | | |
|---|---|---|
| CN | 104952032 | 9/2015 |
| CN | 105096297 | 11/2015 |
| CN | 105787020 | 7/2016 |
| CN | 107193896 | 9/2017 |
| CN | 108132838 | 6/2018 |
| CN | 108804226 | 11/2018 |
| CN | 109165325 | 1/2019 |
| CN | 113010748 | 6/2021 |
| CN | 113792170 | 12/2021 |
| WO | WO 2023083241 | 5/2023 |

OTHER PUBLICATIONS

International Search Report and Written Opinion in International Appln. No. PCT/CN2022/131042, mailed on Jan. 20, 2023, 17 pages (with English translation).

Li et al., "Research on Graph Partitioning in Distributed Graph Computing," Dessertation for the degree of Doctor of Engineering, Chongqing University, School of Software Engineering, Dec. 15, 2020, 32 pages (with English Abstract).

* cited by examiner

Partition vertices in graph data into a plurality of datasets — S21

Partition edges in the graph data into datasets that include target vertices of the edges — S23

GRAPH DATA PARTITIONING

CROSS-REFERENCE TO RELATED APPLICATIONS

This application is a continuation of PCT Application No. PCT/CN2022/131042, filed on Nov. 10, 2022, which claims priority to Chinese Patent Application No. 202111345319.4, filed on Nov. 15, 2021, which are hereby incorporated by reference in their entireties.

TECHNICAL FIELD

One or more embodiments of this specification relate to the field of computer technologies, and in particular, to graph data partition methods, apparatuses, and clients.

BACKGROUND

As a data structure, graph data have a strong expressive capability. In actual applications, service data that have an association relationship can be converted to graph data, and the graph data can be computed by using a distributed cluster.

For this, the graph data need to be partitioned so that the graph data are distributed to a plurality of nodes of the distributed cluster.

SUMMARY

One or more embodiments of this specification provide graph data partition methods, apparatuses, and clients, to partition graph data.

According to a first aspect of one or more embodiments of this specification, a graph data partition method is provided, including: partitioning vertices in graph data into a plurality of datasets; and partitioning edges in the graph data into datasets that include target vertices of the edges, where the datasets are used by nodes in a distributed cluster to perform graph computation, and computational loads of the plurality of datasets are similar.

According to a second aspect of one or more embodiments of this specification, a graph data partition method is provided, including: obtaining a local feature of graph data, where the local feature is used to represent a degree of proximity between vertices; partitioning vertices in the graph data into a plurality of datasets according to the local feature; and partitioning edges in the graph data into the plurality of datasets, where the datasets are used by nodes in a distributed cluster to perform graph computation, and computational loads of the plurality of datasets are similar.

According to a third aspect of one or more embodiments of this specification, a graph data partition apparatus is provided, including: a first partition unit, configured to partition vertices in graph data into a plurality of datasets; and a second partition unit, configured to partition edges in the graph data into datasets that include target vertices of the edges, where the datasets are used by nodes in a distributed cluster to perform graph computation, and computational loads of the plurality of datasets are similar.

According to a fourth aspect of one or more embodiments of this specification, a graph data partition apparatus is provided, including: an acquisition unit, configured to obtain a local feature of graph data, where the local feature is used to represent a degree of proximity between vertices; a first partition unit, configured to partition vertices in the graph data into a plurality of datasets according to the local feature; and a second partition unit, configured to partition edges in the graph data into the plurality of datasets, where the datasets are used by nodes in a distributed cluster to perform graph computation, and computational loads of the plurality of datasets are similar.

According to a fifth aspect of one or more embodiments of this specification, a computer device is provided, including: at least one processor; and a memory storing program instructions, where the program instructions are configured to adapt to be executed by the at least one processor, and the program instructions include instructions configured to perform the method according to the first aspect or the second aspect.

According to the technical solutions provided in one or more embodiments of this specification, the computational loads of the plurality of datasets are similar, so that load balancing between nodes in the distributed cluster can be achieved. In addition, the edges in the graph data are partitioned into datasets that include target vertices, so that a quantity of communications between the nodes can be reduced, thereby saving communication overheads. In addition, the vertices in the graph data are partitioned into the plurality of datasets according to the local feature so that the quantity of communications between the nodes can also be reduced, thereby saving communication overheads.

BRIEF DESCRIPTION OF DRAWINGS

To describe technical solutions in one or more embodiments of this specification or in the existing technologies more clearly, the following briefly describes the accompanying drawings required for describing the one or more embodiments or the existing technologies. The accompanying drawings described below are merely some embodiments described in this specification, and a person of ordinary skill in the art can derive other accompanying drawings from these accompanying drawings without creative efforts.

DESCRIPTION OF EMBODIMENTS

Figures 1, 2:
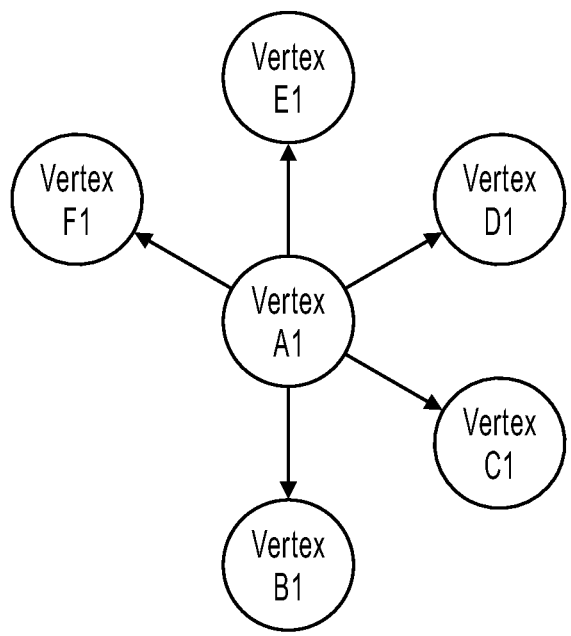
FIG. 1 is a schematic diagram illustrating graph data, according to one or more embodiments of this specification.
FIG. 2 is a schematic flowchart illustrating a graph data partition method, according to one or more embodiments of this specification.

The following clearly and comprehensively describes technical solutions in one or more embodiments of this specification with reference to the accompanying drawings in the one or more embodiments of this specification. Clearly, described embodiments are merely some rather than all of the embodiments of this specification. All other embodiments obtained by a person of ordinary skill in the art based on the embodiments of this specification without creative efforts shall fall within the protection scope of this specification.

Graph data are a type of data structure. The graph data can include vertices and edges. The graph data can include directed graph data and undirected graph data. An edge of the directed graph data is a directed edge, and a direction of the directed edge is from a source vertex to a target vertex. An edge of the undirected graph data is an undirected edge. For example, the graph data can be represented as G=(V, E). V represents a vertex set, and the vertex set can include vertices in graph data G. E represents an edge set, and the edge set can include edges in the graph data G. An edge in the edge set can be represented as e=(u, v), where u is a source vertex of an edge e, and v is a target vertex of the edge e.

In actual applications, service data that have an association relationship can be converted to graph data. Specifically, a service entity can be converted to a vertex in the graph data, and a relationship between service entities can be converted to an edge in the graph data. For example, a web page can be converted to the vertex in the graph data, and link relationships between web pages can be converted to the edges in the graph data. For another example, an account can be converted to the vertex in the graph data, and fund transfer relationships between accounts can be converted to the edges in the graph data.

Graph computation is computation performed on the graph data. Graph computation can be widely used in fields such as social networks, recommendation systems, cybersecurity, text retrieval, and biomedicine. For example, a web page can be converted to the vertex in the graph data, and link relationships between web pages can be converted to the edges in the graph data. For the graph data, algorithms such as PageRank can be used to perform graph computation, to obtain importance of the web pages. A web page with a high level of importance can be ranked first during searching on the Internet.

The distributed cluster can include a plurality of nodes, and the node can include a computer device. To facilitate graph computation on the graph data using the distributed cluster, the graph data can be partitioned. Graph data partitioning refers to partitioning graph data into a plurality of pieces of subgraph data. The plurality of pieces of subgraph data can be allocated to a plurality of nodes in the distributed cluster for computation. Specifically, the following two factors can be considered for graph data partition. (1) There is little difference in scale between the subgraph data. As such, when the plurality of pieces of subgraph data are allocated to the plurality of nodes in the distributed cluster for computation, computational loads of the nodes are similar to each other, and load balancing is achieved between the nodes. (2) A quantity of edges connected between the subgraph data is as small as possible. As such, when the plurality of pieces of subgraph data are allocated to the plurality of nodes in the distributed cluster for computation, a quantity of communications between the nodes is relatively small, so that communication overheads are reduced, and computation efficiency is improved.

In related techniques, a graph data partition method can include: hash partitioning vertices in graph data into a plurality of datasets; and partitioning edges in the graph data into datasets that include source vertices of the edges. Each dataset can be understood as one piece of subgraph data in the graph data. However, partitioning the vertices using the hash manner does not consider a relationship between the vertices in the graph data. Consequently, a quantity of edges connected between the datasets is relatively large, and a quantity of communications between nodes is increased. In addition, partitioning the edges in the graph data into the datasets that include the source vertices of the edges can also increase the quantity of communications between the nodes. For example, a plurality of edges can correspond to one source vertex and a plurality of target vertices. Hash partitioning the vertices in the graph data into the plurality of datasets may possibly cause the source vertex to be located at one node (referred to as a first node below) and cause the plurality of target vertices to be located at another node (referred to as a second node below). When graph computation is performed, information about the source vertex is used to compute information about the target vertex along the edge. Since the edges and the source vertex are located at the first node, to enable the second node to obtain information about which target vertices should be computed along which edges, for each of the plurality of edges, the first node needs to send information about the source vertex to the second node. As such, the first node needs to send the information about the source vertex to the second node for a plurality of times, causing a relatively large quantity of communications between the first node and the second node.

The information about the vertex can include information about a service entity that corresponds to the vertex. For example, the service entity that corresponds to the vertex can be a web page, and the information about the vertex can include a probability that the web page is accessed. For another example, the service entity that corresponds to the vertex can be an account, and the information about the vertex can include a fund balance of the account.

For example, graph data shown in FIG. 1 can include a vertex A1, a vertex B1, a vertex C1, a vertex D1, a vertex E1, a vertex F1, an edge e=(A1, B1), an edge e=(A1, C1), an edge e=(A1, D1), an edge e=(A1, E1), and an edge e=(A1, F1). The distributed cluster can include three nodes such as node P0, node P1, and node P2. Identifiers of the vertex A1, the vertex B1, the vertex C1, the vertex D1, the vertex E1, the vertex F1 are respectively 0, 1, 2, 3, 4, and 5. The remainder obtained by dividing an identifier 0 of the vertex A1 and an identifier 3 of the vertex D1 by 3 is 0, and the vertex A1 and the vertex D1 can be partitioned to a dataset S0 that corresponds to the node P0. The remainder obtained by dividing an identifier 1 of the vertex B1 and an identifier 4 of the vertex E1 by 3 is 1, and the vertex B1 and the vertex E1 can be partitioned to a dataset S1 that corresponds to the node P1. The remainder obtained by dividing an identifier 2 of the vertex C1 and an identifier 5 of the vertex F1 by 3 is 2, and the vertex C1 and the vertex F1 can be partitioned to a dataset S2 that corresponds to the node P2. Source vertices of the edge e=(A1, B1), the edge e=(A1, C1), the edge e=(A1, D1), the edge e=(A1, E1), and the edge e=(A1, F1) are the vertex A1, and the edge e=(A1, B1), the edge e=(A1, C1), the edge e=(A1, D1), the edge e=(A1, E1), and the edge e=(A1, F1) can be partitioned into the dataset S0.

When graph computation is performed, for the edge e=(A1, B1), the node P0 needs to send information about the vertex A1 to the node P1; for the edge e=(A1, C1), the node P0 needs to send the information about the vertex A1 to the node P2; for the edge e=(A1, E1), the node P0 needs to the information about the vertex A1 to the node P1; for the edge e=(A1, F1), the node P0 needs to the information about the vertex A1 to the node P2. As such, when graph computation is performed, the node P0 needs to send the information about the vertex A1 to the node P1 twice, and needs to send the information about the vertex A1 to the node P2 twice.

This causes a relatively large quantity of communications between the node P0 and the node P1/the node P2.

An implementation environment in one or more embodiments of this specification can include a graph data processing system.

In some embodiments, the graph data processing system can include a distributed cluster. The distributed cluster can be used to partition graph data, and further can be used to compute the graph data.

A target node in the distributed cluster is configured to partition the graph data, to obtain a plurality of datasets. Each dataset can include vertices and/or edges, and therefore can be understood as one piece of subgraph data. The target node can allocate the plurality of datasets to a plurality of nodes in the distributed cluster. Each node in the distributed cluster can obtain one or more datasets. Each node in the distributed cluster can directly perform graph computation according to a dataset. Alternatively, each node in the distributed cluster can partition a dataset into a plurality of subsets; and can perform graph computation according to the plurality of subsets in a parallel way. Certainly, the target node can also partition each dataset into a plurality of subsets; and can allocate the plurality of subsets to one node in the distributed cluster, so that the node performs graph computation according to the plurality of subsets in a parallel way.

Alternatively, the target node in the distributed cluster is configured to partition vertices in the graph data, to obtain a plurality of vertex sets. The vertex set can include one or more vertices. Identifiers in each vertex set constitute one identifier set. The target node can allocate a plurality of identifier sets to the plurality of nodes in the distributed cluster. Each node in the distributed cluster can obtain one or more identifier sets; can read a corresponding vertex from the graph data according to the identifier set; can read an edge using the vertex as a source vertex or an edge using the vertex as a target vertex from the graph data; and therefore, obtains a dataset including the vertex and/or the edge. Each node in the distributed cluster can directly perform graph computation according to a dataset. Alternatively, each node in the distributed cluster can partition a dataset into a plurality of subsets; and can perform graph computation according to the plurality of subsets in a parallel way.

The target node can be obtained through selection in the distributed cluster. For example, one node can be randomly selected from the distributed cluster and used as the target node. For another example, a node with the strongest computing capability can be alternatively selected from the distributed cluster and used as the target node.

The identifier of the vertex can be preset. Alternatively, a local feature of the graph data can be obtained, where the local feature is used to represent a degree of proximity between vertices; and an identifier can be allocated to the vertex in the graph data according to the local feature. A numbering sequence of the identifiers represents the degree of proximity between the vertices. A process in which the identifier is allocated to the vertex in the graph data is described in detail subsequently.

In some embodiments, the graph data processing system can include a partition server and a distributed cluster.

The partition server is configured to partition the graph data, to obtain a plurality of datasets. Each dataset can include a vertex and/or an edge, and therefore can be understood as one piece of subgraph data. The partition server can allocate the plurality of datasets to a plurality of nodes in the distributed cluster. Each node in the distributed cluster can obtain one or more datasets. Each node in the distributed cluster can directly perform graph computation according to a dataset. Alternatively, each node in the distributed cluster can partition a dataset into a plurality of subsets; and can perform graph computation according to the plurality of subsets in a parallel way. Certainly, the partition server can also partition each dataset into a plurality of subsets; and can allocate the plurality of subsets to one node in the distributed cluster, so that the node performs graph computation according to the plurality of subsets in a parallel way.

One or more embodiments of this specification provide a graph data partition method.

The graph data partition method can be used for a computer device. The computer device can include a partition server and a distributed cluster. Referring to FIG. 2, the graph data partition method can include the following steps.

Step S21. Partition vertices in graph data into a plurality of datasets.

In some embodiments, a quantity of the datasets can be determined according to a quantity of nodes in a distributed cluster. Specifically, a quantity of the datasets can be equal to, greater than, or less than the quantity of nodes in the distributed cluster. For example, the quantity of nodes in the distributed cluster can be obtained and used as the quantity of the datasets. In this way, each dataset can correspond to one node in the distributed cluster and is used by one node in the distributed cluster to perform graph computation. For another example, alternatively, the quantity of nodes in the distributed cluster can be obtained; and the quantity of nodes in the distributed cluster can be multiplied by 2, used as the quantity of the datasets. In this way, every two datasets can correspond to one node in the distributed cluster and are used by one node in the distributed cluster to perform graph computation.

In some embodiments, step S21 is performed, so that each dataset can include one or more vertices. In actual applications, the vertices in the graph data can be partitioned into the plurality of datasets in a random way. Alternatively, the vertices in the graph data can be partitioned into the plurality of datasets in a hash way. For example, remainders obtained by dividing identifiers of the vertices by P can be computed, and the vertices can be partitioned into datasets that correspond to the remainders, where P is the quantity of datasets. Alternatively, a local feature of the graph data can be obtained; and the vertices in the graph data can be partitioned into the plurality of datasets according to the local feature.

The graph data can be analyzed by using a graph search algorithm, to obtain the local feature of the graph data. The graph search algorithm can include a breadth first search (BFS) algorithm, a depth first search (DFS) algorithm, etc. The local feature is used to represent a degree of proximity between vertices. The local feature can include whether vertices are neighbor vertices. Specifically, if there is an edge connected between two vertices, that is, the two vertices are neighbor vertices, a degree of proximity between the two vertices is relatively large. If there is no edge connected between two vertices, that is, the two vertices are not neighbor vertices, a degree of proximity between the two vertices is relatively small. Alternatively, the local feature can include a shortest path between vertices. Specifically, if a shortest path between two vertices is relatively short, a degree of proximity between the two vertices is relatively large. If a shortest path between two vertices is relatively long, a degree of proximity between the two vertices is relatively small. Partitioning the vertices in the graph data according to the local feature is beneficial to reducing a quantity of edges connected between datasets, reducing a quantity of communications between nodes, and saving communication overheads.

Identifiers can be allocated to the vertices in the graph data according to the local feature; and the vertices in the graph data can be partitioned into the plurality of datasets according to a numbering sequence of the identifiers. The identifier is used to identify a vertex, and can specifically include a number, a character, a character string including a number and a character, etc. The numbering sequence of the identifiers can be consecutive or can be non-consecutive. The numbering sequence of the identifiers can represent the degree of proximity between vertices. Vertices that have a relatively large degree of proximity have identifiers that are relatively close in numbering sequence; vertices that have a relatively small degree of proximity have identifiers that are relatively far in numbering sequence. The vertices in the graph data can be continuously partitioned into the plurality of datasets according to the numbering sequence of the identifiers. In this way, a degree of proximity between vertices inside a dataset is relatively large, and a degree of proximity between vertices in different datasets is relatively small, so that a quantity of edges connected between the datasets is reduced.

Figure 3:
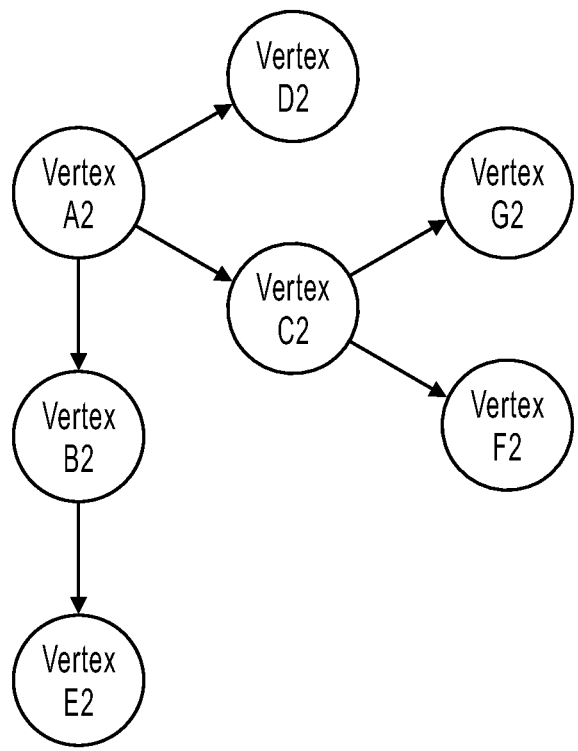
FIG. 3 is a schematic diagram illustrating graph data, according to one or more embodiments of this specification.

For example, graph data shown in FIG. 3 can include a vertex A2, a vertex B2, a vertex C2, a vertex D2, a vertex E2, a vertex F2, a vertex G2, an edge e=(A2, B2), an edge e=(B2, E2), an edge e=(A2, C2), an edge e=(A2, D2), an edge e=(C2, F2), and an edge e=(C2, G2). In the graph data shown in FIG. 3, the vertex A2 and the vertex B2 are neighbor vertices, the vertex A2 and the vertex C2 are neighbor vertices, the vertex A2 and the vertex D2 are neighbor vertices, the vertex B2 and the vertex E2 are neighbor vertices, the vertex C2 and the vertex F2 are neighbor vertices, and the vertex C2 and the vertex G2 are neighbor vertices. Therefore, identifiers 0, 1, 2, 3, 4, 5, and 6 can be respectively allocated to the vertex A2, the vertex B2, the vertex C2, the vertex D2, the vertex E2, the vertex F2, and the vertex G2 depending on whether vertices are neighbor vertices. Identifiers of the vertex A2, the vertex B2, the vertex C2, the vertex D2, the vertex E2, the vertex F2, and the vertex G2 are consecutive in numbering sequence. In addition, the identifier 0 of the vertex A2 and the identifier 1 of the vertex B2 are relatively close in numbering sequence, the identifier 0 of the vertex A2 and the identifier 2 of the vertex C2 are relatively close in numbering sequence, and the identifier 0 of the vertex A2 and the identifier 3 of the vertex D2 are relatively close in numbering sequence. The identifier 1 of the vertex B2 and the identifier 4 of the vertex E2 are relatively close in numbering sequence. The identifier 2 of the vertex C2 and the identifier 5 of the vertex F2 are relatively close in numbering sequence, and the identifier 2 of the vertex C2 and the identifier 6 of the vertex G2 are relatively close in numbering sequence.

The plurality of datasets can include a dataset S0, a dataset S1, and a dataset S2. According to the numbering sequence of the identifiers, the vertex A2 and the vertex B2 can be partitioned into the dataset S0, the vertex C2 and the vertex D2 can be partitioned into the dataset S1, and the vertex E2, the vertex F2, and the vertex G2 can be partitioned into the dataset S2. In this way, a quantity of edges connected between the dataset S0, the dataset S1, and the dataset S1 is reduced.

Certainly, the vertices in the graph data can be alternatively directly partitioned into the plurality of datasets according to a local feature. For example, the vertices in the graph data can be partitioned into the plurality of datasets depending on whether the vertices are neighbor vertices. For another example, the vertices in the graph data can be directly partitioned into the plurality of datasets according to a shortest path between the vertices.

In some embodiments, to achieve load balancing between nodes in the distributed cluster, computational loads of the plurality of datasets can be similar. The computational load of the dataset can be understood as a working amount of a node when performing graph computation on the dataset. That the computational loads of the plurality of datasets are similar can include: The computational loads are equal or a difference between the computational loads is in a preset range.

A computational load reference value can be determined. In a process of partitioning the vertices, the computational loads of the datasets can be determined, so that the computational load of the dataset is similar to the computational load reference value. That the computational load of the dataset is similar to the computational load reference value can include: The computational load of the dataset is equal to the computational load reference value, or a difference between the computational load of the dataset and the computational load reference value is in a preset range.

The computational load reference value can be determined according to a quantity of the vertices in the graph data and a quantity of the datasets. For example, the computational load reference value can be determined according to a formula $V \div P$. V represents a quantity of the vertices in the graph data, and P represents a quantity of the datasets. Correspondingly, a quantity of vertices in the dataset can be counted as the computational load of the dataset. Alternatively, a quantity of edges of the vertex can include a quantity of incoming edges and/or a quantity of outgoing edges of the vertex. The incoming edges of the vertex can include an edge using the vertex as a target vertex, and the outgoing edges of the vertex can include an edge using the vertex as a source vertex. Quantities of edges of different vertices may differ greatly. To accurately evaluate the computational load of the dataset and improve the effectiveness of load balancing, the computational load reference value can alternatively be determined based on the quantity of the vertices in the graph data, a quantity of edges of the vertex, and the quantity of the datasets. For example, the computational load reference value can be determined according to a formula $(V + E_{in\_V} + E_{out\_V}) \div P$. V represents the quantity of the vertices in the graph data, $E_{in\_V}$ represents a sum of quantities of incoming edges of the vertices in the graph data, $E_{out\_V}$ represents a sum of quantities of outgoing edges of the vertices in the graph data, and P represents the quantity of the datasets. Correspondingly, the computational load of the dataset can be determined according to a quantity of vertices in the dataset and a quantity of edges of the vertex. For example, the computational load of the dataset can be determined according to a formula $N + E_{in\_N} + E_{out\_N}$. N represents the quantity of vertices in the dataset, $E_{in\_N}$ represents a sum of quantities of incoming edges of the vertices in the dataset, and $E_{out\_N}$ represents a sum of quantities of outgoing edges of the vertices in the dataset.

In actual applications, for the plurality of datasets, partitioning can be performed in a serial way. Specifically, the vertices in the graph data can be partitioned into one dataset, and a computational load of the dataset is computed, so that the computational load of the dataset is similar to the computational load reference value. Then, the vertices in the graph data can be partitioned into another dataset, and a computational load of the dataset is computed, so that the computational load of the dataset is similar to the computational load reference value. In this way, iteration is continuously performed.

Certainly, in a process of partitioning the vertices, the computational loads of the datasets can be further determined, and the computational loads of the datasets are compared, so that the computational loads of the datasets are similar. In actual applications, for the plurality of datasets, partitioning can be performed in a parallel way. Specifically, several vertices in the graph data can be partitioned into the plurality of datasets, computational loads of the datasets are determined, and the computational loads of the datasets are compared, so that the computational loads of the datasets are similar. Then, several vertices in the graph data are partitioned into the plurality of datasets, computational loads of the datasets are determined, and the computational loads of the datasets are compared, so that the computational loads of the datasets are similar. In this way, iteration is continuously performed, to partition the vertices.

Step S23. Partition edges in the graph data into datasets that include target vertices of the edges.

In some embodiments, step S23 is performed, so that each dataset can include a vertex and/or an edge, and therefore each dataset can be understood as one piece of subgraph data. The edges in the graph data are partitioned into the datasets that include the target vertices of the edges. In this way, when graph computation is performed, for each vertex, a node sends information about the vertex at most once to another node in the distributed cluster, without sending the information about the vertex a plurality of times, so that a quantity of communications between nodes is reduced, thereby saving communication overheads. For example, a plurality of edges can correspond to one source vertex and a plurality of target vertices. Partitioning the vertices in the graph data into the plurality of datasets may possibly cause the source vertex to be located at one node (referred to as a first node below) and cause the plurality of target vertices to be located at another node (referred to as a second node below). When graph computation is performed, information about the source vertex is used to compute information about the target vertex along the edge. Since the edges and the target vertices are both located at the second node, the first node can send information about the source vertex to the second node only once, so that the second node can compute information about the target vertices along a plurality of edges. This reduces a quantity of communications between the first node and the second node.

The graph data shown in FIG. 1 is used as an example. Target vertices of the edge e=(A1, B1), the edge e=(A1, C1), the edge e=(A1, D1), the edge e=(A1, E1), and the edge e=(A1, F1) are respectively the vertex B1, the vertex C1, the vertex D1, the vertex E1, and the vertex F1. Therefore, the edge e=(A1, B1) and the edge e=(A1, E1) can be partitioned into the dataset S1, the edge e=(A1, C1) and the edge e=(A1, F1) can be partitioned into the dataset S2, and the edge e=(A1, D1) can be partitioned into the dataset S0.

When graph computation is performed, the node P0 can send information about the vertex A1 to the node P1 only once, and can send the information about the vertex A1 to the node P2 only once, so that a quantity of communications between the node P0 and the node P1/the node P2 can be reduced.

In some embodiments, for each edge in the graph data, a dataset that includes a target vertex of the edge can be obtained; and the edge can be partitioned into the dataset that includes the target vertex. Alternatively, to improve partition efficiency of the edges, a table can be further built, where each row and each column of the table separately correspond to one dataset; for each edge in the graph data, a target row is determined in the table according to a source vertex of the edge, a target column is determined in the table according to a target vertex of the edge, and the edge can be partitioned into a cell limited by the target row and the target column; and an edge in a cell in each column can be partitioned into a dataset that corresponds to the column.

A quantity of rows and a quantity of columns can be equal and can be equal to the quantity of the datasets. The target row can be a row that corresponds to a dataset that includes the source vertex. The target column can be a column that corresponds to a dataset that includes the target vertex. The cell limited by the target row and the target column can be a cell that uses the target row as a row and that uses the target column as a column.

The graph data shown in FIG. 3 is used as an example, and a table shown as Table 1 below can be built.

TABLE 1

| Corresponding Dataset | Dataset S0 | Dataset S1 | Dataset S2 |
|---|---|---|---|
| Dataset S0 | | e = (A2, B2) | e = (A2, C2) | e = (B2, E2) |
| | | | e = (A2, D2) | |
| Dataset S1 | | | | e = (C2, F2) |
| | | | | e = (C2, G2) |
| Dataset S2 | | | | |

By using Table 1, the edge e=(A2, B2) can be partitioned into the dataset S0; the edge e=(A2, C2) and the edge e=(A2, D2) can be partitioned into the dataset S1; and the edge e=(B2, E2), the edge e=(C2, F2), and the edge e=(C2, G2) can be partitioned into the dataset S2.

In some embodiments, the dataset can be partitioned into a plurality of subsets, where the plurality of subsets are used by one node in a distributed cluster to perform graph computation. The node can specifically perform computation according to the plurality of subsets in a parallel way. As such, random reads and writes to the dataset can be limited to a relatively small subset, so that resource overheads caused by large-scale random reads and writes can be reduced. In addition, step S21 and step S23 are performed, so that partitioning of the graph data is achieved between nodes; and the dataset is partitioned into the plurality of subsets, so that partitioning of the dataset is achieved inside a node. As such, computation efficiency can be improved through two layers of partitioning between nodes and inside a node.

A quantity of the subsets can be determined according to a thread quantity of a node that corresponds to the dataset. The quantity of the subsets can be equal to, greater than, or less than the thread quantity. For example, the quantity of the subsets can be computed by using a formula 2T1, where T1 represents the thread quantity of the node. As such, the node can perform graph computation according to the plurality of subsets in a multi-threaded way. Alternatively, the quantity of the subsets can be determined according to a process quantity of a node that corresponds to the dataset. The quantity of the subsets can be equal to, greater than, or less than the process quantity. For example, the quantity of the subsets can be computed by using a formula 2T2, where T2 represents the process quantity of the node. As such, the node can perform graph computation according to the plurality of subsets in a multi-process way.

Each dataset can be partitioned into a plurality of subsets in a way similar to that of partitioning the graph data into the plurality of datasets computational loads of the plurality of subsets are similar, so that load balancing can be achieved between threads or between processes.

In actual applications, the node can perform graph computation by using a work stealing (work stealing) algorithm, to achieve load balancing between the threads or between the processes. Certainly, the node can alternatively perform graph computation by using another algorithm. Details are omitted here.

According to the graph data partition method in one or more embodiments of this specification, the vertices in the graph data can be partitioned into the plurality of datasets; and the edges in the graph data can be partitioned into the datasets that include the target vertices of the edges. The computational loads of the plurality of datasets are similar, so that load balancing can be achieved between the nodes in the distributed cluster. In addition, the edges in the graph data are partitioned into the datasets that include the target vertices of the edges, which can also reduce a quantity of communications between the nodes, and reduce communication overheads.

One or more embodiments of this specification provide a graph data partition method.

Figure 4:
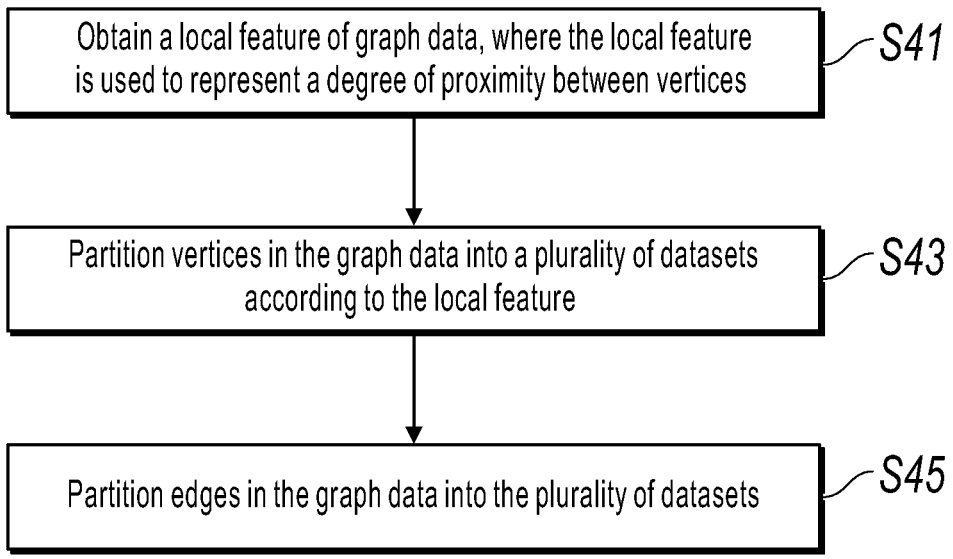
FIG. 4 is a schematic flowchart illustrating a graph data partition method, according to one or more embodiments of this specification.

The graph data partition method can be used for a computer device. The computer device can include a partition server and a distributed cluster. Referring to FIG. 4, the graph data partition method can include the following steps.

Step S41. Obtain a local feature of graph data, where the local feature is used to represent a degree of proximity between vertices.

Step S43. Partition vertices in the graph data into a plurality of datasets according to the local feature.

Step S45. Partition edges in the graph data into the plurality of datasets, where the datasets are used by nodes in a distributed cluster to perform graph computation, and computational loads of the plurality of datasets are similar. For related descriptions of step S41 and step S43, reference can be made to the embodiment that corresponds to FIG. 2. Details are omitted here.

In step S45, the edges in the graph data can be partitioned into datasets that include source vertices of the edges. Alternatively, the edges in the graph data can be partitioned into datasets that include source vertices of the edges. This is not specifically limited in one or more embodiments of this specification.

According to the technical solutions provided in one or more embodiments of this specification, the local feature of the graph data can be obtained, where the local feature is used to represent the degree of proximity between vertices; the vertices in the graph data can be partitioned into the plurality of datasets according to the local feature; the edges in the graph data can be partitioned into the plurality of datasets; and the computational loads of the plurality of datasets are similar, so that load balancing can be achieved between the nodes in the distributed cluster. In addition, the vertices in the graph data are partitioned into the plurality of datasets according to the local feature so that the quantity of communications between the nodes can also be reduced, thereby saving communication overheads.

Figure 5:
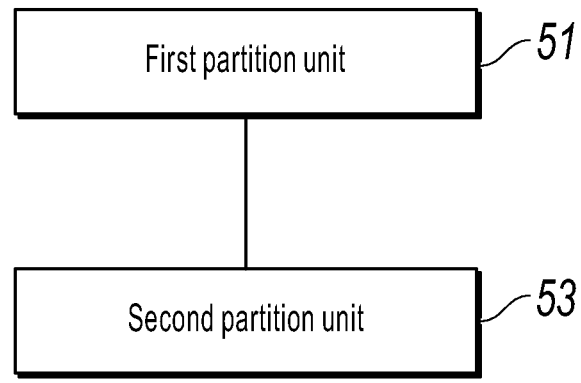
FIG. 5 is a schematic diagram illustrating a structure of a graph data partition apparatus, according to one or more embodiments of this specification.

One or more embodiments of this specification further provide a graph data partition apparatus. The graph data partition apparatus can be used for a partition server, a distributed cluster, or a node in the distributed cluster. Referring to FIG. 5, the graph data partition apparatus includes the following units.

A first partition unit 51 is configured to partition vertices in graph data into a plurality of datasets; and a second partition unit 53 is configured to partition edges in the graph data into datasets that include target vertices of the edges, where the datasets are used by nodes in a distributed cluster to perform graph computation, and computational loads of the plurality of datasets are similar.

Figure 6:
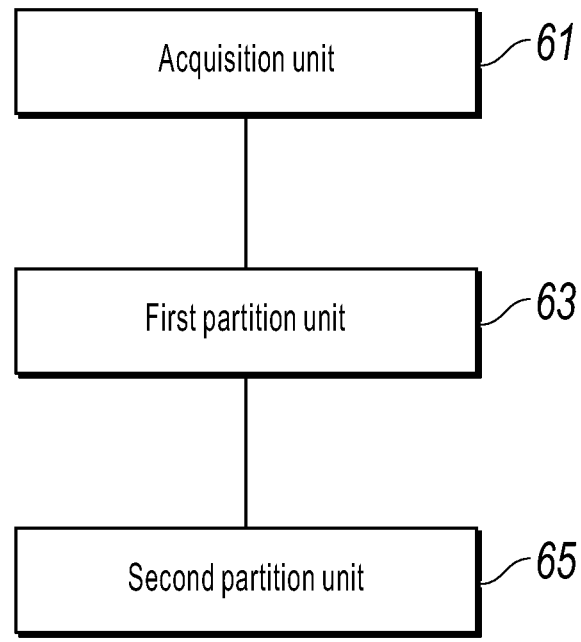
FIG. 6 is a schematic diagram illustrating a structure of a graph data partition apparatus, according to one or more embodiments of this specification.

One or more embodiments of this specification further provide a graph data partition apparatus. The graph data partition apparatus can be used for a partition server, a distributed cluster, or a node in the distributed cluster. Referring to FIG. 6, the graph data partition apparatus includes the following units.

An acquisition unit 61 is configured to obtain a local feature of graph data, where the local feature is used to represent a degree of proximity between vertices; a first partition unit 63 is configured to partition vertices in the graph data into a plurality of datasets according to the local feature; and a second partition unit 65 is configured to partition edges in the graph data into the plurality of datasets, where the datasets are used by nodes in a distributed cluster to perform graph computation, and computational loads of the plurality of datasets are similar.

Figure 7:
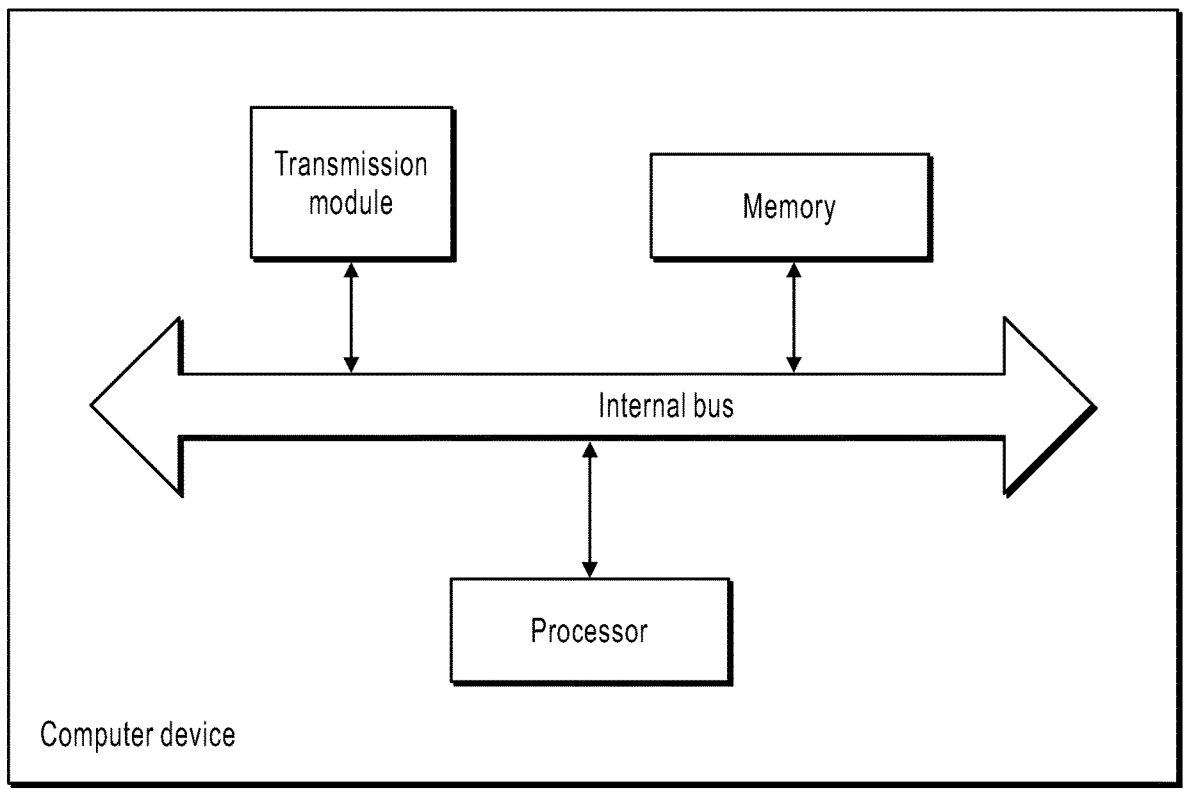
FIG. 7 is a schematic diagram illustrating a structure of a computer device, according to one or more embodiments of this specification.

The following describes one or more embodiments of a computer device in this specification. FIG. 7 is a schematic diagram illustrating a hardware structure of a computer device, according to one or more embodiments. As shown in FIG. 7, the computer device can include one or more processors (only one is shown in the figure), a memory, and a transmission module. Certainly, a person of ordinary skill in the art can understand that the hardware structure shown in FIG. 7 is merely an example, and does not impose a limitation on the hardware structure of the computer device described above. In practice, the computer device can further include more or fewer component units than those shown in FIG. 7; or have configurations different from those shown in FIG. 7.

The memory can include a high-speed random access memory; or can further include a non-volatile memory, such as one or more magnetic storage apparatuses, a flash memory, or another non-volatile solid-state memory. Certainly, the memory can further include a remotely disposed network memory. The memory can be configured to store program instructions or modules of application software, for example, the program instructions or modules of the embodiment that corresponds to FIG. 2 or FIG. 4 in this specification.

The processor can be implemented by using any appropriate method. For example, the processor can be in a form of a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microcontroller. The processor can read and execute the program instructions or modules in the memory.

The transmission module can be configured to perform data transmission by using a network, for example, by using a network such as the Internet, an enterprise intranet, a local area network, or a mobile communications network.

This specification further provides one or more embodiments of a computer storage medium. The computer storage medium includes but is not limited to a random access memory (RAM), a read-only memory (ROM), a cache, a hard disk drive (HDD), and a memory card. The computer storage medium stores computer program instructions. When the computer program instructions are executed, program instructions or modules in the embodiment that corresponds to FIG. 2 or FIG. 4 in this specification are implemented.

It should be noted that, the embodiments in this specification are described in a progressive way. For same or similar parts of the embodiments, references can be made to the embodiments mutually. Each embodiment focuses on a difference from other embodiments. Particularly, apparatus embodiments, computer device embodiments, and computer storage medium embodiments are similar to method embodiments, and therefore are described briefly. For related parts, references can be made to related descriptions in the method embodiments. In addition, it can be understood that, a person skilled in the art can, after reading the document of this specification, figure out any combination of some or all of the embodiments listed in this specification without creative efforts. These combinations also fall within the protection scope disclosed in this specification.

In the 1990s, whether a technical improvement is a hardware improvement (for example, an improvement to a circuit structure such as a diode, a transistor, or a switch) or a software improvement (an improvement to a method process) can be clearly distinguished. However, as technologies develop, current improvements to many method processes can be considered as direct improvements to hardware circuit structures. A designer usually programs an improved method process into a hardware circuit, to obtain a corresponding hardware circuit structure. Therefore, a method process can be improved by using a hardware entity module. For example, a programmable logic device (PLD) (for example, a field programmable gate array (FPGA)) is such an integrated circuit, and a logical function thereof is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should be aware that a hardware circuit that implements a logical method procedure can be readily obtained provided that the method procedure is logically programmed using the above several described hardware description languages and is programmed into an integrated circuit.

The system, apparatus, module, or unit illustrated in the above embodiments can be specifically implemented using a computer chip or an entity, or can be implemented using a product having a certain function. A typical implementation device is a computer. Specifically, the computer can be, for example, a personal computer, a laptop computer, a cellular phone, a camera phone, a smart phone, a personal digital assistant, a media player, a navigation device, an e-mail device, a game console, a tablet computer, a wearable device, or any combination of these devices.

It can be learned from the descriptions of the above implementations that, a person skilled in the art can clearly understand that this specification can be implemented by software and a necessary general-purpose hardware platform. Based on such an understanding, the technical solutions of this specification essentially or the part contributing to the existing technologies can be embodied in a form of a software product. The computer software product can be stored in a storage medium, such as a ROM/RAM, a magnetic disk, or an optical disc, and includes several instructions for enabling a computer device (which can be a personal computer, a server, a network device, or the like) to perform the method described in embodiments of this specification or some parts of the embodiments.

This specification can be applied to numerous general-purpose or special-purpose computer system environments or configurations, for example, a personal computer, a server computer, a handheld device or a portable device, a tablet device, a multi-processor system, a microprocessor-based system, a set top box, a programmable consumer electronic device, a network PC, a small-scale computer, a large-scale computer, and a distributed computing environment that includes any of the aforementioned systems or devices, etc.

This specification can be described in common contexts of computer-executable instructions executed by a computer, such as a program module. Generally, the program module includes a routine, a program, an object, a component, a data structure, etc. executing a specific task or implementing a specific abstract data type. This specification can alternatively be practiced in distributed computing environments. In the distributed computing environments, tasks are performed by remote processing devices connected through a communication network. In the distributed computing environments, the program module can be located in a local and remote computer storage medium including a storage device.

Although this specification is depicted by using embodiments, it is known to a person of ordinary skill in the art that, this specification has many variations and changes without departing from the spirit of this specification, and it is desired that the appended claims include these variations and changes without departing from the spirit of this specification.

What is claimed is:

1. A computer-implemented method for graph data partitioning, comprising:
 performing a layer-1 partitioning on graph data to generate a first plurality of datasets, wherein each dataset in the first plurality of datasets corresponds to a respective node in a plurality of nodes in a distributed cluster, and wherein performing the layer-1 partitioning comprises:
 partitioning vertices in the graph data into the first plurality of datasets;
 partitioning edges in the graph data into the first plurality of datasets that include target vertices of the edges,
 performing a layer-2 partitioning on the first plurality of datasets to generate, for each node in the plurality of nodes in the distributed cluster, a second plurality of datasets, wherein for each node, a number of the second plurality of datasets is dependent on a count of threads or a count of processes of the node; and
 performing graph computation on the second plurality of datasets by each node in the plurality of nodes in the distributed cluster.

2. The computer-implemented method of claim 1, wherein partitioning the vertices in the graph data into the first plurality of datasets, comprises:
- determining a computational load reference value according to the graph data and a quantity of the datasets;
- partitioning the vertices in the graph data into the first plurality of datasets; and
- in a partition process, determining the computational loads of the first plurality of datasets, so that computational loads of the first plurality of datasets are similar to the computational load reference value.

3. The computer-implemented method of claim 2, wherein determining the computational load reference value, comprises:
- determining the computational load reference value according to a quantity of the vertices in the graph data, a quantity of edges of a vertex, and the quantity of the datasets; and
- the determining the computational loads of the first plurality of datasets comprises:
  - determining the computational loads of the first plurality of datasets according to a quantity of vertices in the dataset and a quantity of edges of the vertex.

4. The computer-implemented method of claim 1, wherein partitioning the vertices in the graph data into the first plurality of datasets, comprises:
- obtaining a local feature of the graph data, wherein the local feature is used to represent a degree of proximity between vertices; and
- partitioning the vertices in the graph data into the first plurality of datasets according to the local feature.

5. The computer-implemented method of claim 4, wherein partitioning the vertices in the graph data into the first plurality of datasets, comprises:
- allocating identifiers to the vertices in the graph data according to the local feature, wherein a numbering sequence of the identifiers is used to represent the degree of proximity; and
- partitioning the vertices in the graph data into the first plurality of datasets according to the numbering sequence of the identifiers.

6. The computer-implemented method of claim 1, wherein partitioning the edges in the graph data into the first plurality of datasets that include the target vertices of the edges, comprises:
- building a table, wherein each row and each column of the table separately correspond to one dataset;
- for each edge in the graph data, determining a target row in the table according to a source vertex of the edge, determining a target column in the table according to a target vertex of the edge, and partitioning the edge into a cell limited by the target row and the target column; and
- partitioning an edge in a cell in each column into a dataset that corresponds to the column.

7. The computer-implemented method of claim 1, wherein performing the layer-2 partitioning comprises, for each node in the plurality of nodes in the distributed cluster:
- partitioning a dataset in the first plurality of datasets into the second plurality of datasets according to the count of threads or the count of processes of the node.

8. A non-transitory, computer-readable medium storing one or more instructions executable by a computer system to perform one or more operations for graph data partitioning, comprising:
- performing a layer-1 partitioning on graph data to generate a first plurality of datasets, wherein each dataset in the first plurality of datasets corresponds to a respective node in a plurality of nodes in a distributed cluster, and wherein performing the layer-1 partitioning comprises:
  - partitioning vertices in the graph data into the first plurality of datasets;
  - partitioning edges in the graph data into the first plurality of datasets that include target vertices of the edges,
- performing a layer-2 partitioning on the first plurality of datasets to generate, for each node in the plurality of nodes in the distributed cluster, a second plurality of datasets, wherein for each node, a number of the second plurality of datasets is dependent on a count of threads or a count of processes of the node; and
- performing graph computation on the second plurality of datasets by each node in the plurality of nodes in the distributed cluster.

9. The non-transitory, computer-readable medium of claim 8, wherein partitioning the vertices in the graph data into the first plurality of datasets, comprises:
- determining a computational load reference value according to the graph data and a quantity of the datasets;
- partitioning the vertices in the graph data into the first plurality of datasets; and
- in a partition process, determining the computational loads of the first plurality of datasets, so that computational loads of the first plurality of datasets are similar to the computational load reference value.

10. The non-transitory, computer-readable medium of claim 9, wherein determining the computational load reference value, comprises:
- determining the computational load reference value according to a quantity of the vertices in the graph data, a quantity of edges of a vertex, and the quantity of the datasets; and
- the determining the computational loads of the first plurality of datasets comprises:
  - determining the computational loads of the first plurality of datasets according to a quantity of vertices in the dataset and a quantity of edges of the vertex.

11. The non-transitory, computer-readable medium of claim 8, wherein partitioning the vertices in the graph data into the first plurality of datasets, comprises:
- obtaining a local feature of the graph data, wherein the local feature is used to represent a degree of proximity between vertices; and
- partitioning the vertices in the graph data into the first plurality of datasets according to the local feature.

12. The non-transitory, computer-readable medium of claim 11, wherein partitioning the vertices in the graph data into the first plurality of datasets, comprises:
- allocating identifiers to the vertices in the graph data according to the local feature, wherein a numbering sequence of the identifiers is used to represent the degree of proximity; and
- partitioning the vertices in the graph data into the first plurality of datasets according to the numbering sequence of the identifiers.

13. The non-transitory, computer-readable medium of claim 8, wherein partitioning the edges in the graph data into the first plurality of datasets that include the target vertices of the edges, comprises:
- building a table, wherein each row and each column of the table separately correspond to one dataset;

for each edge in the graph data, determining a target row in the table according to a source vertex of the edge, determining a target column in the table according to a target vertex of the edge, and partitioning the edge into a cell limited by the target row and the target column; and partitioning an edge in a cell in each column into a dataset that corresponds to the column.

14. The non-transitory, computer-readable medium of claim 8, wherein performing the layer-2 partitioning comprises, for each node in the plurality of nodes in the distributed cluster:

partitioning a dataset in the first plurality of datasets into the second plurality of datasets according to the count of threads or the count of processes of the node.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

performing a layer-1 partitioning on graph data to generate a first plurality of datasets, wherein each dataset in the first plurality of datasets corresponds to a respective node in a plurality of nodes in a distributed cluster, and wherein performing the layer-1 partitioning comprises:

partitioning vertices in the graph data into the first plurality of datasets;

partitioning edges in the graph data into the first plurality of datasets that include target vertices of the edges, performing a layer-2 partitioning on the first plurality of datasets to generate, for each node in the plurality of nodes in the distributed cluster, a second plurality of datasets, wherein for each node, a number of the second plurality of datasets is dependent on a count of threads or a count of processes of the node; and performing graph computation on the second plurality of datasets by each node in the plurality of nodes in the distributed cluster.

16. The computer-implemented system of claim 15, wherein partitioning the vertices in the graph data into the first plurality of datasets, comprises:

determining a computational load reference value according to the graph data and a quantity of the datasets;

partitioning the vertices in the graph data into the plurality of datasets; and in a partition process, determining the computational loads of the datasets, so that a computational load of the dataset is similar to the computational load reference value.

17. The computer-implemented system of claim 16, wherein determining the computational load reference value, comprises:

determining the computational load reference value according to a quantity of the vertices in the graph data, a quantity of edges of a vertex, and the quantity of the datasets; and the determining the computational loads of the datasets comprises:

determining the computational load of a dataset according to a quantity of vertices in the dataset and a quantity of edges of the vertex.

18. The computer-implemented system of claim 15, wherein partitioning the vertices in the graph data into the first plurality of datasets, comprises:

obtaining a local feature of the graph data, wherein the local feature is used to represent a degree of proximity between vertices; and partitioning the vertices in the graph data into the first plurality of datasets according to the local feature.

19. The computer-implemented system of claim 18, wherein partitioning the vertices in the graph data into the first plurality of datasets, comprises:

allocating identifiers to the vertices in the graph data according to the local feature, wherein a numbering sequence of the identifiers is used to represent the degree of proximity; and partitioning the vertices in the graph data into the first plurality of datasets according to the numbering sequence of the identifiers.

20. The computer-implemented system of claim 15, wherein partitioning the edges in the graph data into the first plurality of datasets that include the target vertices of the edges, comprises:

building a table, wherein each row and each column of the table separately correspond to one dataset;

for each edge in the graph data, determining a target row in the table according to a source vertex of the edge, determining a target column in the table according to a target vertex of the edge, and partitioning the edge into a cell limited by the target row and the target column; and partitioning an edge in a cell in each column into a dataset that corresponds to the column.

\* \* \* \* \*